(12) United States Patent
Tazuke

(10) Patent No.: US 11,275,822 B2
(45) Date of Patent: Mar. 15, 2022

(54) AUTHENTICATION SYSTEM

(71) Applicant: KYOCERA Document Solutions Inc., Osaka (JP)

(72) Inventor: Koichiro Tazuke, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 498 days.

(21) Appl. No.: 16/445,368

(22) Filed: Jun. 19, 2019

(65) Prior Publication Data

US 2019/0392130 A1 Dec. 26, 2019

(30) Foreign Application Priority Data

Jun. 25, 2018 (JP) .............................. JP2018-120012

(51) Int. Cl.
| | |
|---|---|
| *G06F 21/31* | (2013.01) |
| *G06F 21/36* | (2013.01) |
| *G06F 3/04883* | (2022.01) |
| *G06K 9/00* | (2022.01) |

(52) U.S. Cl.
CPC .......... *G06F 21/36* (2013.01); *G06F 3/04883* (2013.01); *G06F 21/31* (2013.01); *G06K 9/00161* (2013.01); *G06F 2221/2133* (2013.01); *G06K 2209/01* (2013.01)

(58) Field of Classification Search
CPC ...... G06F 21/36; G06F 3/04883; G06F 21/31; G06F 2221/2133; G06K 9/00161; G06K 2209/01; G06K 9/2081; G06K 9/00402; H04N 2201/0094; H04N 1/00244; H04N 1/00392; H04N 1/0097; H04N 1/00973; H04N 1/4413; H04N 1/4433
See application file for complete search history.

(56) References Cited

U.S. PATENT DOCUMENTS

| | | | | |
|---|---|---|---|---|
| 2005/0228993 | A1* | 10/2005 | Silvester | ............... H04L 9/3231 713/168 |
| 2014/0091905 | A1* | 4/2014 | Wang | ....................... G05B 1/01 340/5.54 |
| 2014/0109208 | A1* | 4/2014 | Song | ....................... G06F 21/31 726/7 |
| 2016/0012315 | A1* | 1/2016 | Perrin | .................. G06K 9/2063 382/161 |
| 2018/0046849 | A1* | 2/2018 | Lapiz | ................. G06K 9/00181 |

FOREIGN PATENT DOCUMENTS

JP 2014-2522 1/2014

* cited by examiner

*Primary Examiner* — Keith D Bloomquist
(74) *Attorney, Agent, or Firm* — Wenderoth, Lind & Ponack, L.L.P.

(57) ABSTRACT

An authentication system includes a user authentication unit. The user authentication unit performs user authentication by combining password authentication and handwriting authentication, the password authentication being performed by collating an entire character string of a password inputted using an operation input unit and a handwriting input unit with an entire character string of a registration password stored in a storage unit, the handwriting authentication being performed by collating the handwriting information of a part of characters of the password inputted by the handwriting input unit with handwriting information of handwriting data of this inputted character stored in the storage unit.

6 Claims, 13 Drawing Sheets

Fig.4

| User ID | Password | Authority level | Handwriting information |
|---|---|---|---|
| abcde | 0ky11 | General user authority | Handwriting information 01 |
| fghij | 6at28 | Administrator authority | Handwriting information 02 |
| klmno | 1oc23 | General user authority | Handwriting information 03 |
| ⁝ | ⁝ | ⁝ | ⁝ |

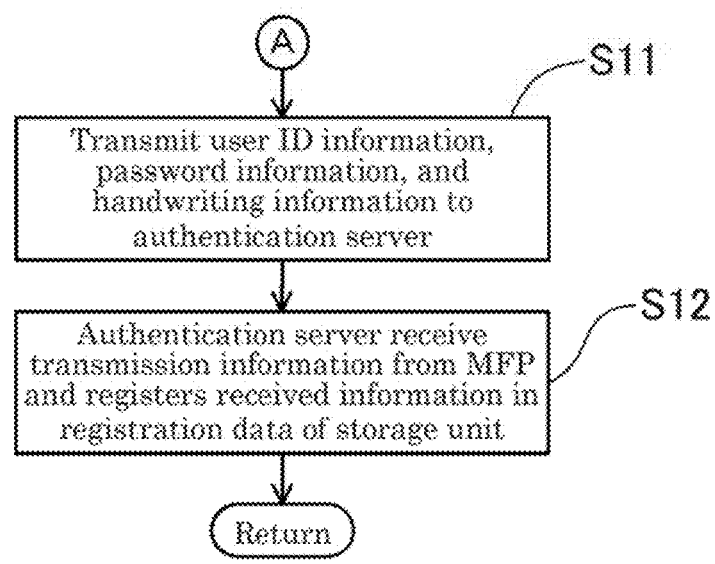

AUTHENTICATION SYSTEM

CROSS-REFERENCE TO RELATED APPLICATION

This application is based upon and claims the benefit of priority from Japanese Patent Application No. 2018-120012 filed on Jun. 25, 2018, the entire contents of which are incorporated herein by reference.

BACKGROUND

The technology of the present disclosure relates to an authentication system.

In the related art, in electronic devices requiring high level security, there is a case where handwriting of characters handwritten by a user is authenticated in order to verify the identity of the user.

In this type of electronic devices, when the electronic devices are used, it is required to handwrite a password from a predetermined input device for example. The input device, for example, is configured by a touch panel, and a password input field is displayed on the touch panel. The electronic device has a CPU that performs various processes based on input information from the input device. The CPU performs password authentication and handwriting authentication based on character data inputted from the aforementioned input device. In the password authentication, it is determined whether the character data inputted from the input device coincides with a password registered in advance. In the handwriting authentication, the features of the handwriting are extracted from data such as the shape, writing pressure, and writing speed of the inputted character, and it is determined whether the extracted features coincide with the features of handwriting of each user registered in advance.

SUMMARY

An authentication system according to one aspect of the present disclosure includes a storage unit, an operation input unit, a handwriting input unit, a password request unit, and a user authentication unit.

The storage unit stores a registration password including a character string, and handwriting information of handwriting data of the character string. The operation input unit is configured to be able to input characters of a password by a key operation. The handwriting input unit is configured to be able to input characters of a password by handwriting. The password request unit requests the input of a part of characters of a password from the handwriting input unit and requests the input of remaining characters from the operation input unit. The user authentication unit performs user authentication by combining password authentication and handwriting authentication. The password authentication is performed by collating an entire character string of the password inputted using the operation input unit and the handwriting input unit with an entire character string of the registration password stored in the storage unit. The handwriting authentication is performed by collating the handwriting information of a part of characters of the password inputted by the handwriting input unit with handwriting information of the handwriting data of this inputted character stored in the storage unit.

BRIEF DESCRIPTION OF THE DRAWINGS

FIG. 4 is an explanation diagram illustrating an example of user registration data stored in a storage unit of the authentication server.

FIG. 7B is a flowchart illustrating a second half of the user registration process.

DETAILED DESCRIPTION

Hereinafter, an example of an embodiment will be described in detail on the basis of the drawings. It is noted that the technology of the present disclosure is not limited to the following embodiments.

Embodiment

Figure 1:
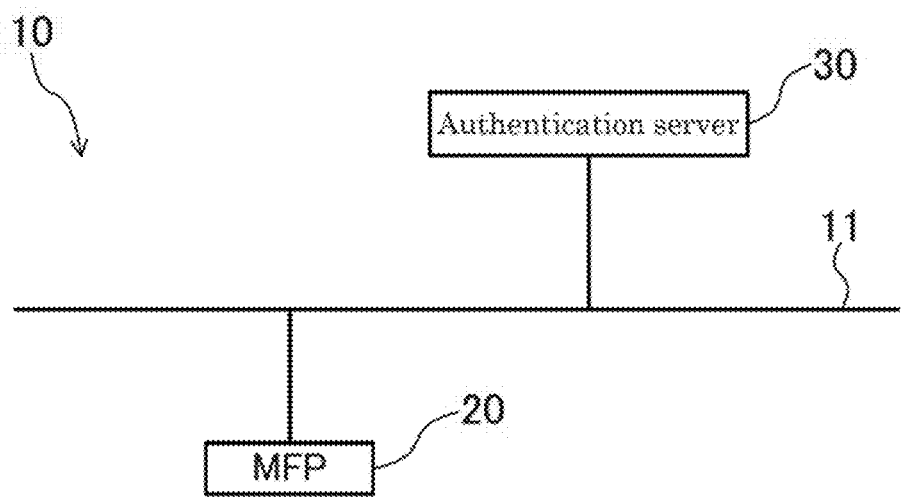
FIG. 1 is a block diagram illustrating a network system including an authentication system in the present embodiment.

FIG. 1 is a block diagram illustrating a schematic configuration of a network system 10 including an authentication system 1 of the present embodiment. The network system 10 has a multifunction peripheral (MFP) 20 and an authentication server 30 that performs authentication of a user who uses the MFP 20. The MFP 20 and the authentication server 30 are communicably connected to each other via a network 11 such as a local area network (LAN).

[Configuration of MFP]

Figure 2:
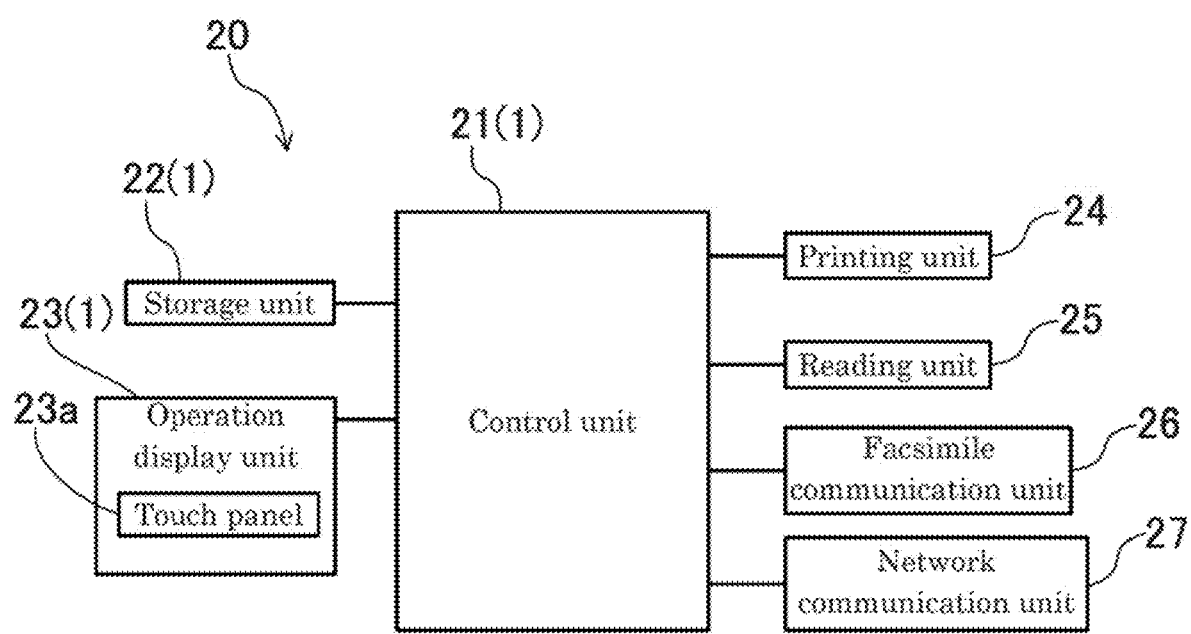
FIG. 2 is a block diagram illustrating a schematic configuration of an MFP illustrated in FIG. 1.

FIG. 2 is a block diagram illustrating a schematic configuration of the MFP 20. The MFP 20 has a control unit 21 that controls an overall operation thereof, a storage unit 22 configured by a hard disk and the like to store various pieces of data, an operation display unit 23 that receives an operation of a user, a printing unit 24 that prints an image on a recording sheet, a reading unit 25 that optically reads a document image, a facsimile communication unit 26 that performs facsimile communication via a communication line of a public telephone line and the like, and a network communication unit 27 that communicates with other devices (the authentication server 30 and the like) via the network 11. The control unit 21, the storage unit 22, and the authentication server 30 to be described below constitute an authentication system 1.

The control unit 21 is configured by a microcomputer having a CPU, a ROM, and a RAM. The control unit 21 switches the function of the MFP 20 to any one of a printer function, a scanner function, a facsimile function, and a copy function by controlling the aforementioned printing unit 24, reading unit 25, facsimile communication unit 26, and network communication unit 27.

The operation display unit 23 receives an input operation of the user from a touch panel 23a or various operation buttons (not illustrated). The touch panel 23a detects a contact of the user's finger and outputs a signal corresponding to the input operation to the control unit 21.

The control unit 21 acquires a user ID, a password, and handwriting information thereof inputted by the user through the touch panel 23a, and transmits the acquired information to the authentication server 30. Then, when receiving a response indicating the success of user authentication from the authentication server 30, the control unit 21 displays a button for performing various functions on the touch panel 23a of the MFP 20 and allows a login to the MFP 20. By so doing, the control unit 21 performs a user authentication process in cooperation with the authentication server 30. Details of the user authentication process will be described below.

[Configuration of Authentication Server]

Figure 3:
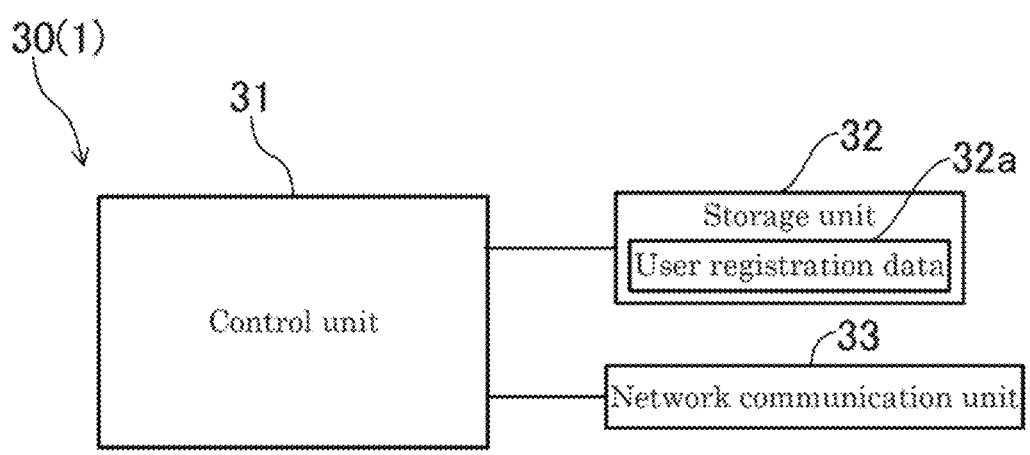
FIG. 3 is a block diagram illustrating a schematic configuration of an authentication server illustrated in FIG. 1.

FIG. 3 is a block diagram illustrating a schematic configuration of the authentication server 30. The authentication server 30 has a control unit 31, a storage unit 32 that stores various pieces of data, and a network communication unit 33 that communicates with other devices (the MFP 20 and the like) via the network 11.

The control unit 31 is configured by a microcomputer having a CPU, a ROM, and a RAM. The storage unit 32 is configured by a hard disk and the like and is connected to the control unit 31 to be able to transmit and receive data. The storage unit 32 stores user registration data 32a inputted through the touch panel 23a of the MFP 20.

The control unit 31 performs password authentication and handwriting authentication based on a password and handwriting information of a user who has received an authentication request from the MFP 20 and the aforementioned user registration data stored in the storage unit 32. When both the password authentication and the handwriting authentication have succeeded, the control unit 31 transmits a response indicating the success in the user authentication to the MFP 20. On the other hand, when at least one of the password authentication and the handwriting authentication has failed, the control unit 31 transmits a response indicating the failure in the user authentication to the MFP 20. By so doing, the control unit 31 serves as a user authentication unit.

[User Registration Data]

FIG. 4 illustrates an example of the user registration data 32a stored in the storage unit 32 of the authentication server 30. The user registration data 32a is data obtained by associating a user ID (user identification information), a registration password, a user authority level, and handwriting information with one another, and is stored in the storage unit 32 in the form of table data for example.

The user ID is an arbitrary character string for identifying a user himself/herself and for example, includes five alphabetic characters in the present embodiment. The registration password is a character string assigned to each user ID and for example, includes five alphanumeric characters in the present embodiment. It is noted that characters constituting the character string include symbols and the like in addition to the alphabetic characters and the numerical characters.

As each user's authority level, two levels of authority of administrator authority and general user authority can be set as an example. The administrator authority is higher than the general user authority. In the general user authority, the use of specific functions in the MFP 20 is prohibited, but in the administrator authority, the use of the specific functions is permitted. The specific functions, for example, include an edition function and the like of the user registration data 32a. It is noted that the authority level is not limited to the two levels of authority of administrator authority and general user authority as in the present embodiment and for example, may be three or more.

The handwriting information is information obtained by recording coordinate information of a finger tip, which moves on the touch panel 23a of the operation display unit 23, along the time series. It is noted that the handwriting information is not limited thereto and may be matrix data and the like obtained by extracting feature amounts related to handwriting (for example, writing pressure, a writing speed, and a handwriting shape).

[User Registration Process]

Figure 5:
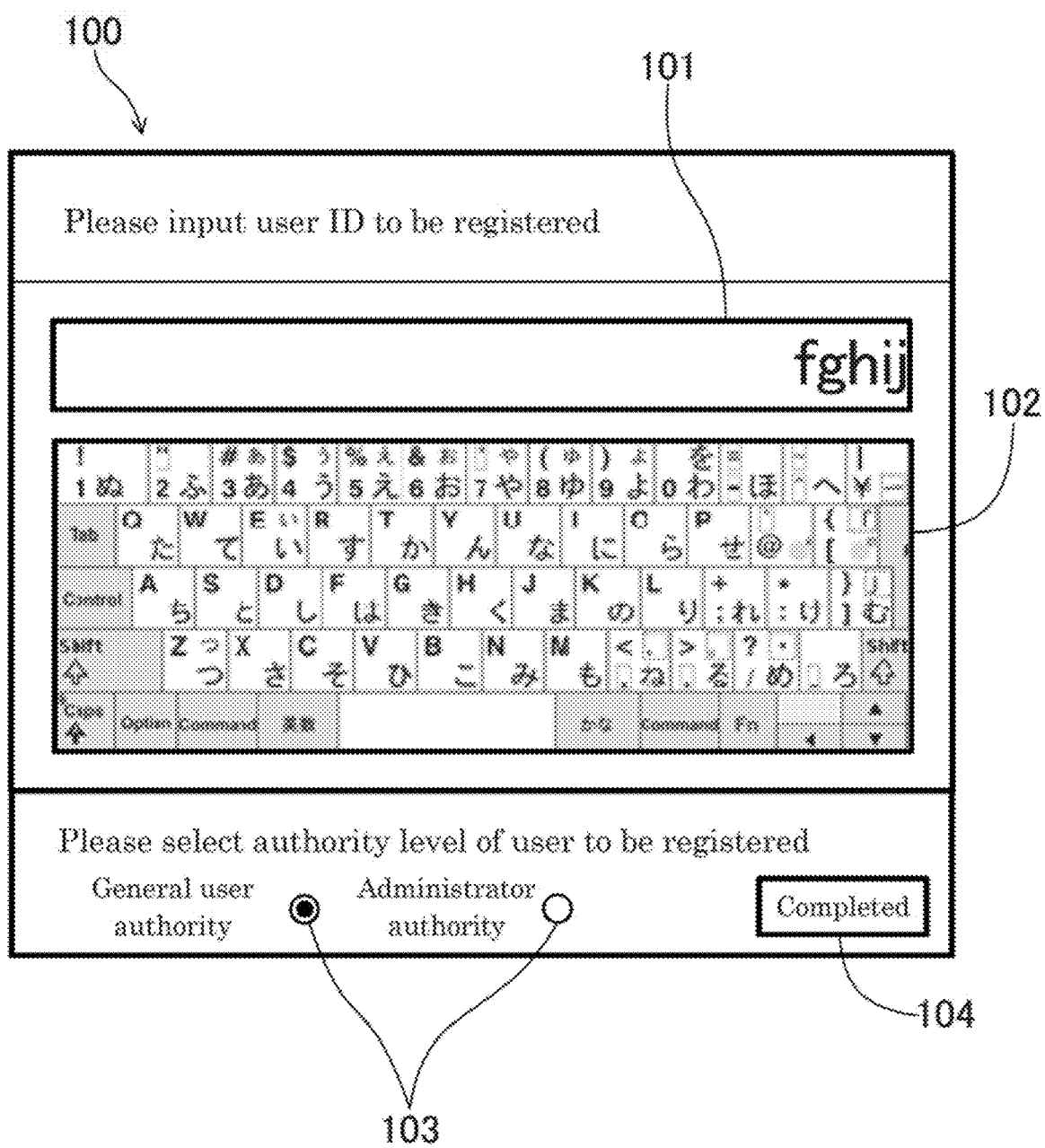
FIG. 5 is an explanation diagram illustrating an example of a user ID registration screen displayed on a touch panel when user registration is performed.
Figure 6:
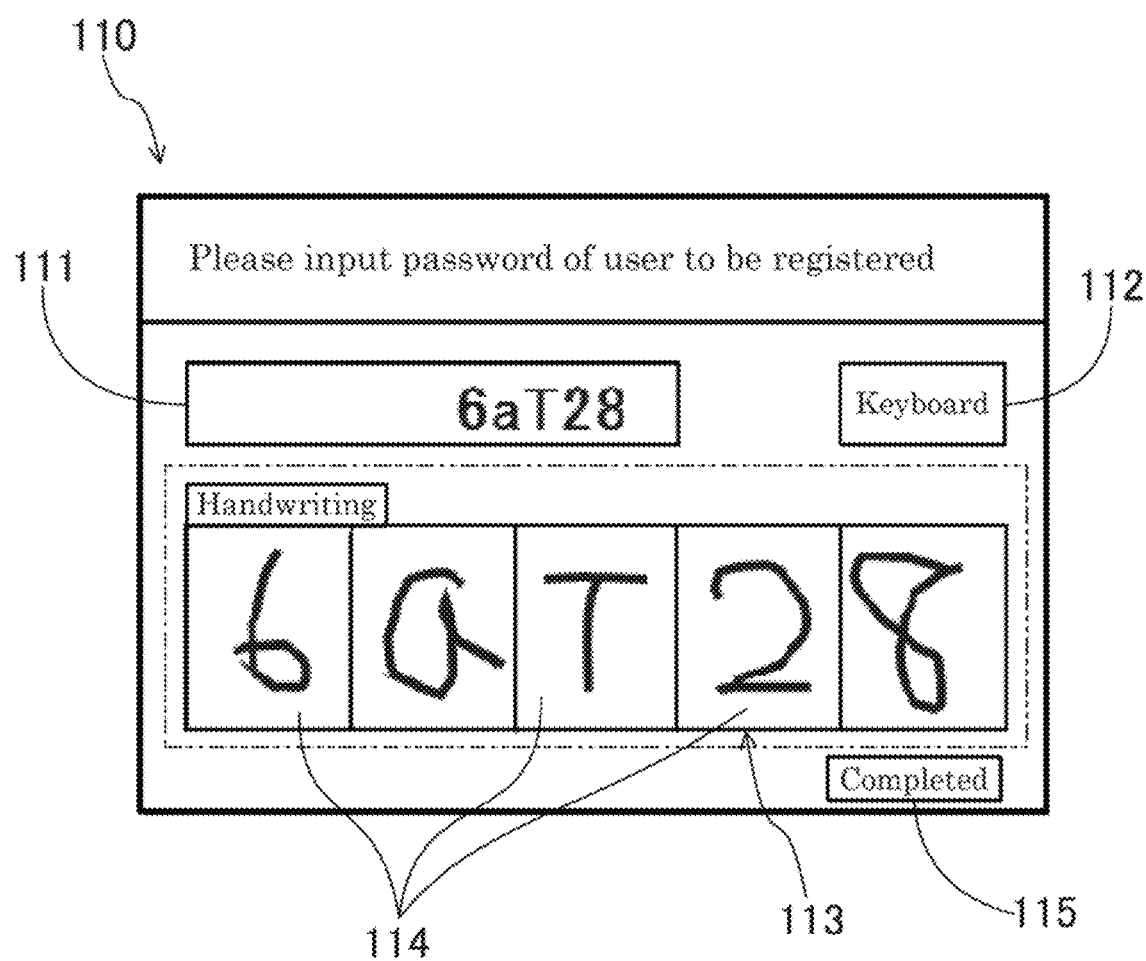
FIG. 6 is an explanation diagram illustrating an example of a password registration screen displayed on the touch panel when the user registration is performed.

Next, with reference to FIG. 5 and FIG. 6, a registration process for newly registering user information in the aforementioned user registration data 32a (hereinafter, referred to as a user registration process) will be described.

The user registration process is started when a setting registration button (not illustrated) displayed on the touch panel 23a of the operation display unit 23 is pressed in a state in which the MFP 20 has been logged in with the administrator authority. When the control unit 21 of the MFP 20 detects that the setting registration button is pressed, the control unit 21 displays a user ID registration screen 100 (see FIG. 5) on the touch panel 23a.

The user ID registration screen 100 has an input box 101 for inputting a user ID of a user to be registered, a soft keyboard 102 for inputting characters to the input box 101, an authority setting button 103 for setting an authority level of the user to be registered, and a completion button 104 for notifying the MFP 20 that the input has been completed. FIG. 6 illustrates an example in which "fghij" is inputted as the user ID and the general user authority is set as the authority level of the user.

When the control unit 21 detects that the completion button is pressed on the user ID registration screen 100, the control unit 21 displays a password registration screen 110 (see FIG. 6) on the touch panel 23a.

The password registration screen 110 has an input box 111 for inputting a password to be registered by a key operation, and a handwriting input field 113 for inputting the password by a handwriting operation. On the right side of the input box 111, a button 112 displayed as a "keyboard" is provided, and when the user presses the button 112, a soft keyboard is displayed on a separate screen (not illustrated) and characters can be inputted to the input box 111 by a keyboard operation. On the other hand, the handwriting input field 113 is configured with five boxes 114 arranged in the horizontal direction of the screen and characters are handwritten in each box 114 one by one. It is noted that the handwriting input includes not only the case where a character is drawn by directly contacting the touch panel 23a with a finger tip, but also the case where a character is drawn on the touch panel 23a by using a device such as a touch pen.

Below the handwriting input field 113, a completion button 115 for notifying the MFP 20 that the input of the password has been completed is provided.

Figure 7A:
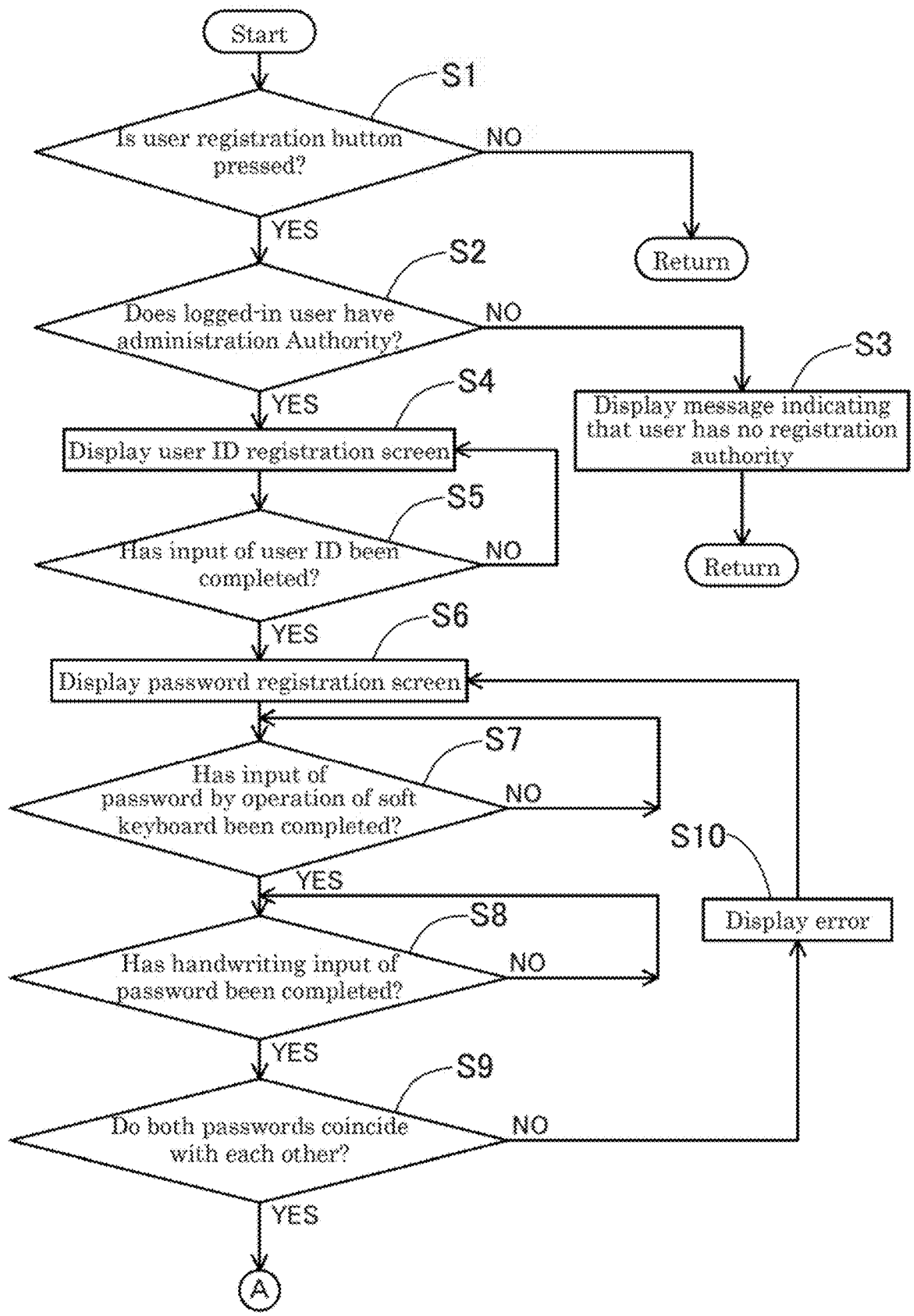
FIG. 7A is a flowchart illustrating a first half of a user registration process.

Next, with reference to the flowcharts of FIG. 7A and FIG. 7B, an example of the aforementioned user registration process will be described. The user registration process is performed by cooperation between the control unit 21 of the MFP 20 and the control unit 31 of the authentication server 30 (when each of the control units 21 and 31 executes a program in the ROM).

In step S1, the control unit 21 of the MFP 20 determines whether the user registration button displayed on the touch panel 23*a* is pressed. When this determination is NO, the control unit 21 returns, and when this determination is YES, the control unit 21 proceeds to step S2.

In step S2, the control unit 21 determines whether a user currently logged in to the MFP 20 has the administration authority. This determination is performed by reading an authority level corresponding to the user by referring to the user registration data 32*a* in the authentication server 30. When this determination is NO, the control unit 21 proceeds to step S3 to display a message indicating that the user has no registration authority on the touch panel 23*a*, and then returns. On the other hand, when this determination is YES, the control unit 21 proceeds to step S4.

In step S4, the control unit 21 of the MFP 20 instructs the operation display unit 23 to display the user ID registration screen 100 (see FIG. 5) on the touch panel 23*a* of the MFP 20.

In step S5, the control unit 21 of the MFP 20 determines whether a pressing signal of the completion button is received from the touch panel 23*a*. When this determination is NO, the control unit 21 returns to step S4, and when this determination is YES, the control unit 21 proceeds to step S6.

In step S6, the control unit 21 of the MFP 20 instructs the operation display unit 23 to display the password registration screen 110 (see FIG. 6) on the touch panel 23*a* of the MFP 20.

In step S7, the control unit 21 of the MFP 20 determines whether the input of a password to the input box 111 by the operation of the soft keyboard has been completed. When this determination is NO, the control unit 21 performs the process of the present step S7 again, and when this determination is YES, the control unit 21 proceeds to step S8.

In step S8, the control unit 21 of the MFP 20 determines whether the handwriting input of the password to the handwriting input field 113 has been completed. When this determination is NO, the control unit 21 performs the process of the present step SB again, and when this determination is YES, the control unit 21 proceeds to step S9.

In step S9, the control unit 21 of the MFP 20 determines whether the input password by the operation of the soft keyboard (step S7) and the input password by the handwriting (step SB) coincide with each other. When this determination is NO, the control unit 21 proceeds to step S10 to display an error and then returns to step S6 to urge re-input. On the other hand, when this determination is YES, the control unit 21 proceeds to step S1*l* (see FIG. 7B).

In step S11, the control unit 21 transmits the user ID inputted in step S5, the password inputted in step S7, and handwriting information of the password handwritten in step S7 from the MFP 20 to the authentication server 30.

In step S12, the control unit 31 of the authentication server 30 receives the user ID, the password, and the handwriting information transmitted from the MFP 20, registers the received information in the user registration data 32*a* stored in the storage unit 32, and then returns.

[User Authentication Process]

Figure 8:
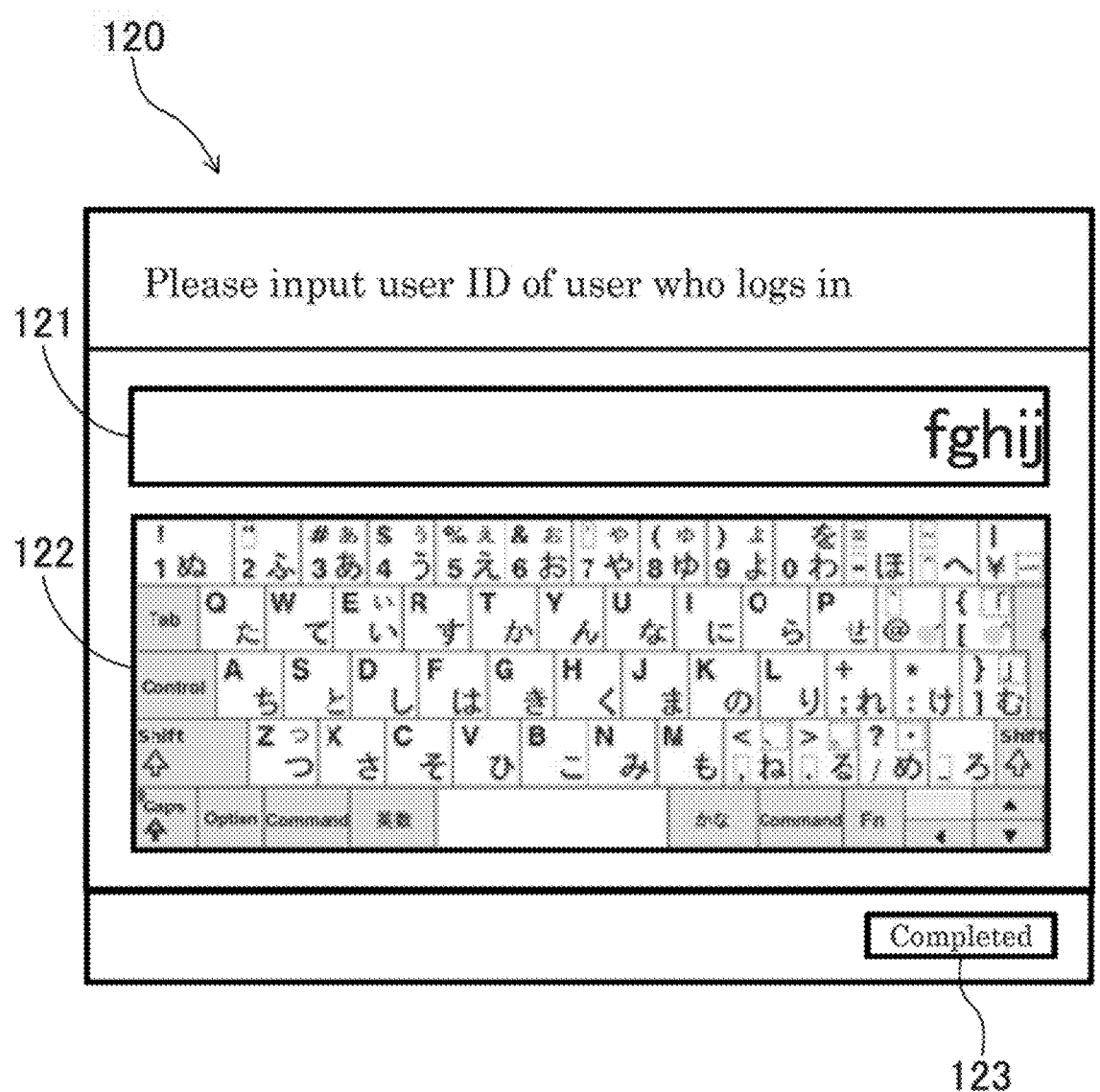
FIG. 8 is an explanation diagram illustrating an example of a user ID input screen displayed on the touch panel when user authentication is performed.

Next, with reference to FIG. 8 to FIG. 10, a user authentication process in an embodiment will be described. The user authentication process is a process for authenticating whether a user who tries to log in to the MFP 20 is the user himself/herself registered in the user registration data 32*a*.

In the user authentication process, firstly, the control unit 21 of the MFP 20 causes a user ID input screen 120 (see FIG. 8) to be displayed on the touch panel 23*a*. The user ID input screen 120 has an input box 121 for inputting a user ID of a user who tries to log in, a soft keyboard 122 for inputting characters to the input box 121, and a completion button 123 for notifying the MFP 20 that the input has been completed. The touch panel 23*a* serves as a user identification information input unit by displaying the user ID input screen 120.

When the control unit 21 detects that the completion button 123 is pressed on the user ID input screen 120, the control unit 21 displays a password input screen 130 on the touch panel 23*a* to request password input by the user. By so doing, the control unit 21 serve as a password request unit.

The password input screen 130 includes two screens of a screen (see FIG. 9) for inputting characters by a soft key operation and a screen (see FIG. 10) for inputting characters by handwriting input. The control unit 21 requests password input while appropriately switching these two screens.

Specifically, the password input screen 130 has an input box 131 for inputting a password. Below the input box 131, a character input unit 132 for inputting characters to the input box 131 is provided, and below the character input unit 132, a completion button 133 for notifying the MFP 20 that the input of all character strings constituting the password has been completed is provided. It is noted that in the examples of FIG. 9 and FIG. 10, the characters inputted in the input box 131 are displayed as "*", but this is because a blind function for preventing the theft of the password is turned on and when the blind function is turned off, the inputted characters can also be displayed in the input box 131 as is.

Figure 9:
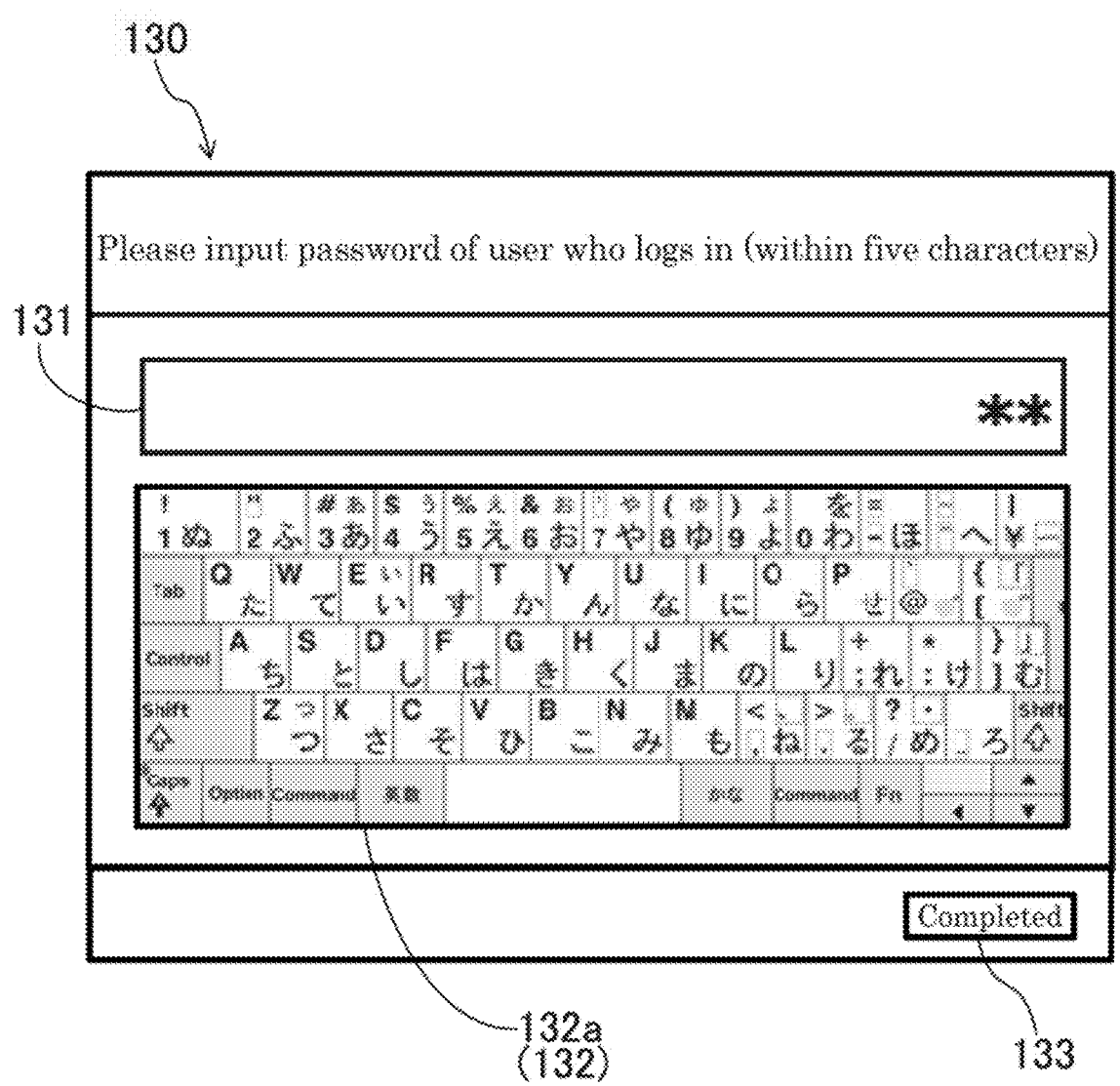
FIG. 9 is a diagram illustrating a password input screen displayed on the touch panel when the user authentication is performed and a state in which a character input unit is configured with a soft keyboard.
Figure 10:
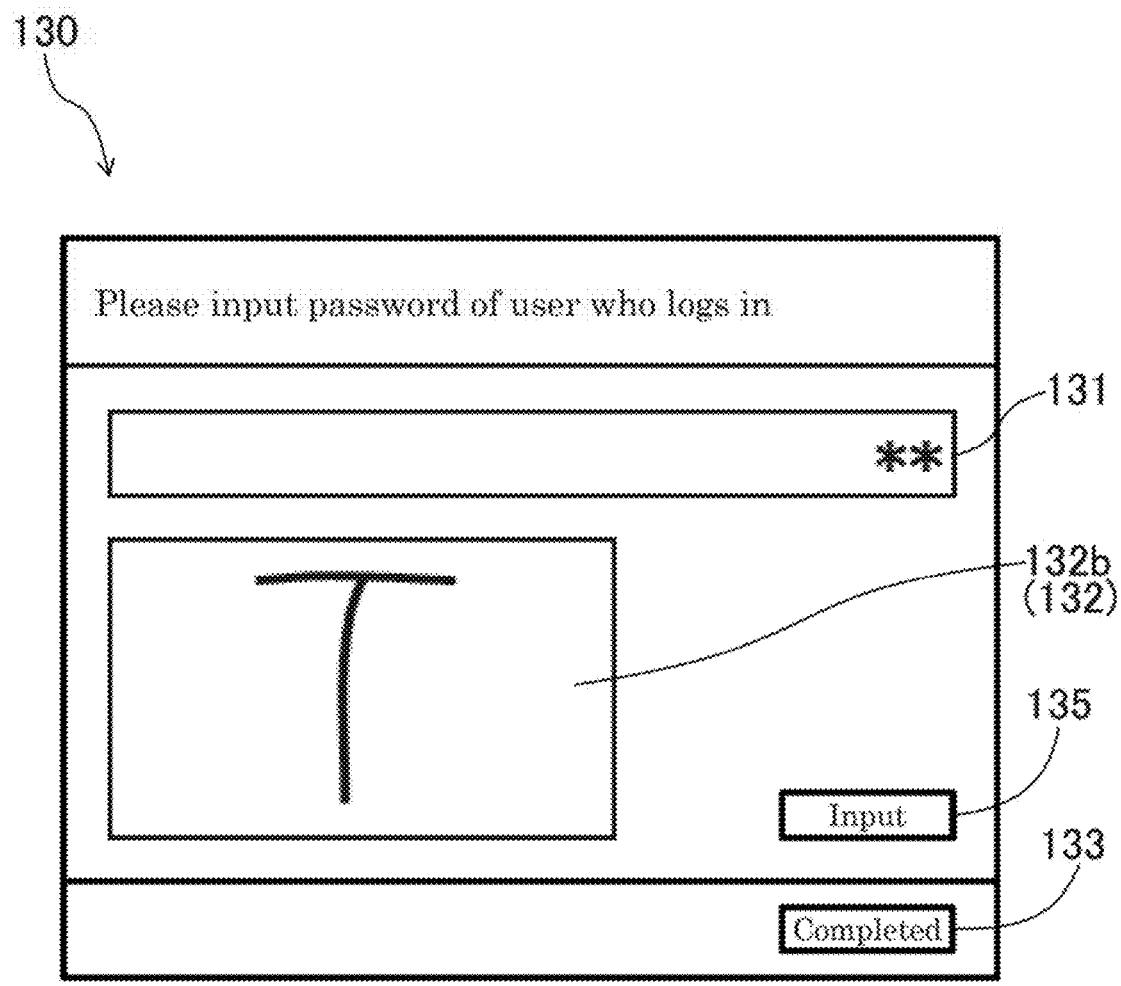
FIG. 10 is a diagram illustrating a password input screen displayed on the touch panel when the user authentication is performed and a state in which the character input unit is configured with a handwriting input field.

The character input unit 132 is basically configured with a soft keyboard (an operation input unit) 132*a* as illustrated in FIG. 9, and is switched to a handwriting input field (a handwriting input unit) 132*b* at a predetermined timing as illustrated in FIG. 10. The handwriting input field 132*b* is configured with a rectangular box, and the input of a handwriting character is completed by sliding a finger in the box to handwrite a character and then pressing an input button 135 on the right side. When the input button 135 is pressed, a character recognition process of the handwriting data in the handwriting input field 132*b* is performed and handwriting information thereof is generated as data in the control unit 21 of the MFP 20. It is noted that the character recognition process is a process of recognizing the handwriting data as alphabetic characters. In the example of FIG. 10, handwriting data including a combination of a horizontal line and a vertical line in the handwriting input field 132*b* is recognized as an alphabetic character "T" by the character recognition process.

The number of times, by which the handwriting input field 132*b* is used (displayed) when a password is inputted, can be set by an authentication condition setting screen 150 to be described below. The timing for displaying the handwriting input field 132*b* (that is, which character is to be inputted in the handwriting input field 132*b*, numbered from the initial character of the password) is randomly determined when the control unit 21 performs a predetermined random number process.

Figure 11A:
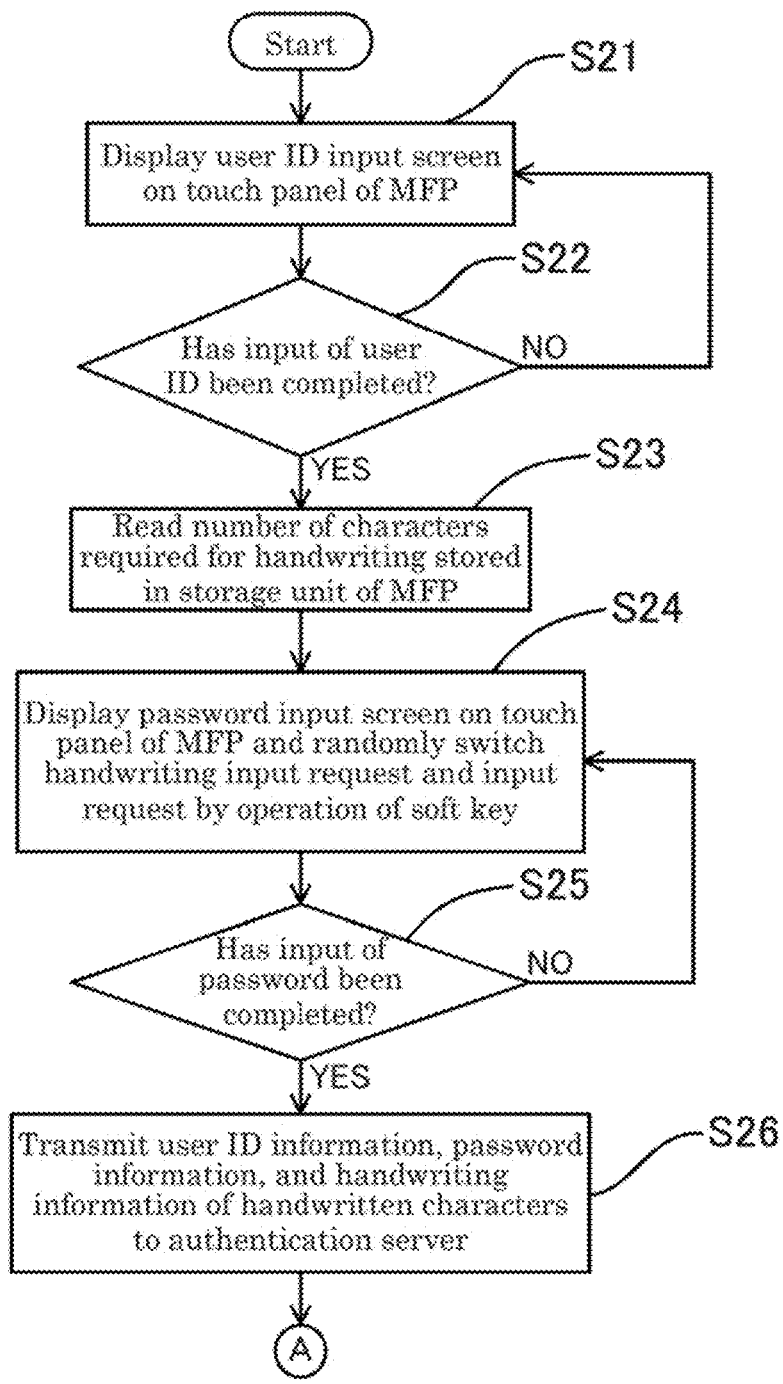
FIG. 11A is a flowchart illustrating a first half of a user authentication process.

Next, with reference to the flowcharts of FIG. 11A and FIG. 118, a specific example of the user authentication process will be described. The user authentication process is performed by cooperation between the control unit 21 of the MFP 20 and the control unit 31 of the authentication server 30.

In the first step S21, the control unit 21 of the MFP 20 instructs the operation display unit 23 to display the user ID input screen 120 (see FIG. 8) on the touch panel 23a.

In step S22, the control unit 21 of the MFP 20 determines whether a pressing operation of the completion button 123 in the user ID input screen 120 is performed. When this determination is NO, the control unit 21 returns to step S21, and when this determination is YES, the control unit 21 proceeds to step S23.

In step S23, the control unit 21 reads the number of characters required for handwriting stored in the storage unit 22 of the MFP 20. The number of characters required for handwriting is set for each user's authority level through the authentication condition setting screen 150 to be described below. The MFP 20 recognizes the user's authority level corresponding to the user ID inputted in step S22 by communicating with the authentication server 30, and reads the number of characters required for handwriting corresponding to the recognized authority level.

In step S24, the control unit 21 instructs the operation display unit 23 to display the password input screen 130 on the touch panel 23a. In such a case, the character input unit 132 of the password input screen 130 is randomly switched to the handwriting input field 132b based on the soft keyboard 132a as a base. After the number of characters inputted in the handwriting input field 132b reaches the number of characters required for handwriting read in step S23, only the soft keyboard 132a is displayed as the character input unit 132.

In step S25, the control unit 21 of the MFP 20 determines whether the completion button 133 of the password input screen 130 is pressed. When this determination is NO, the control unit 21 returns to step S24, and when this determination is YES, the control unit 21 proceeds to step S26.

In step S26, the control unit 21 transmits the user ID inputted from the user ID input screen 120 (step S21), the entire character string of the password inputted from the password input screen 130 (the character string including the key input characters and the handwritten characters), and handwriting information of some characters of the handwritten password from the MPP 20 to the authentication server 30.

Figure 11B:
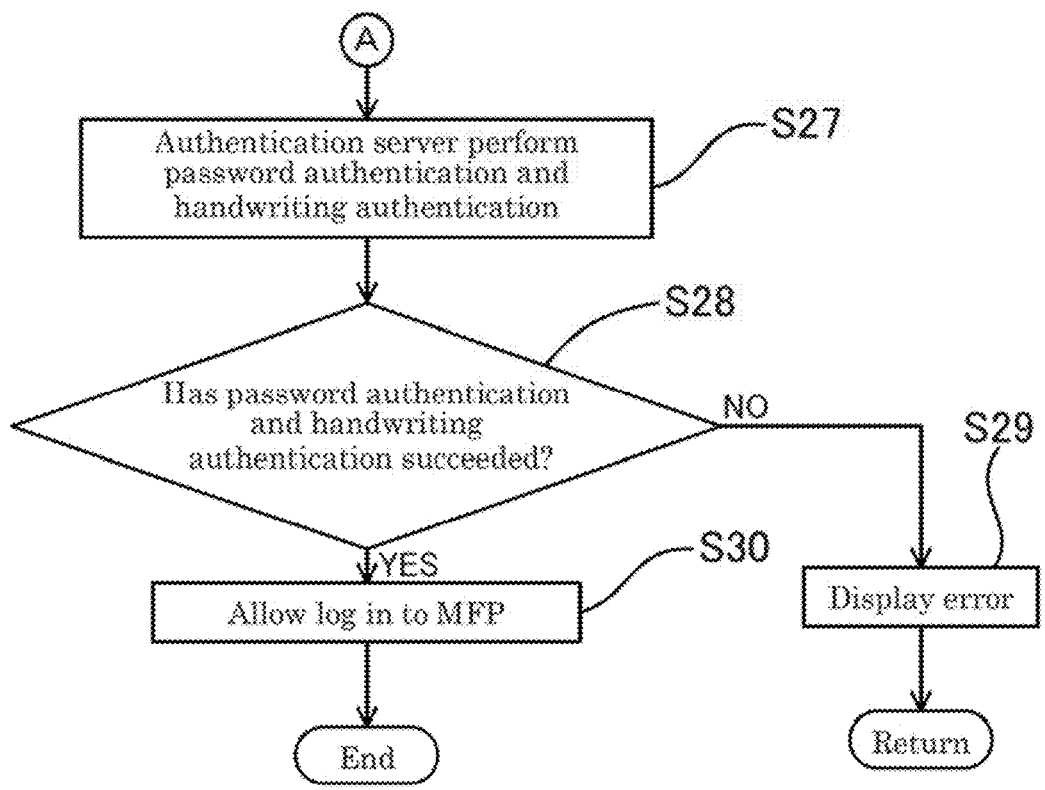
FIG. 11B is a flowchart illustrating a second half of the user authentication process.

In step S27 (see FIG. 11B), the control unit 31 of the authentication server 30 collates the user ID, the entire character string of the password, and the handwriting information of some characters of the handwritten password, which are transmitted from the MFP 20, with the aforementioned user registration data 32a stored in the storage unit 32, thereby performing password authentication and handwriting authentication of some characters of the input password.

In the password authentication, it is authenticated whether the input password of a user coincides with the password of the user registered in the user registration data. In the handwriting authentication, it is authenticated whether the degree of similarity between the handwriting information of some characters of the handwritten password and handwriting information of the characters registered in the user registration data is a predetermined value or more.

In step S28, the control unit 31 of the authentication server 30 determines whether both the password authentication and the handwriting authentication have succeeded. When this determination is NO, the control unit 31 proceeds to step S29 to transmit information indicating the failure in the user authentication from the authentication server 30 to the MFP 20, and the MFP 20 displays an error. On the other hand, when the determination of step S28 is YES, the control unit 31 proceeds to step S30 to transmit information indicating the success in the user authentication from the authentication server 30 to the MFP 20 and allows login to the MFP 20. After the processes of step S29 and step S30 are ended, the control unit 31 returns.

In step S30, an operation screen for performing various functions is displayed on the touch panel 23a of the MFP 20 to allow the user to log in to the MFP 20, and then the user authentication process is ended.

[Setting of Authentication Condition]

Next, a setting process of an authentication condition when performing the user authentication process will be described. The authentication condition setting process is performed when a condition setting button (not illustrated) displayed on the touch panel 23a is pressed in the state in which the MFP 20 has been logged in with the administrator authority.

Figure 12:
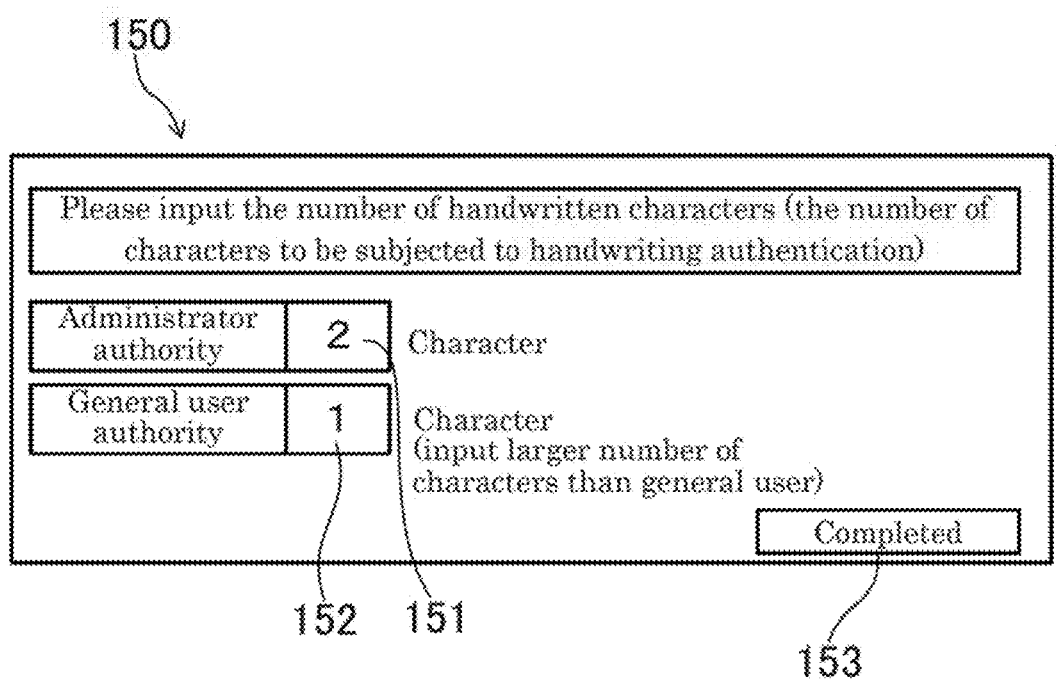
FIG. 12 is an explanation diagram illustrating an example of an authentication condition setting screen.

When the condition setting button is pressed, the control unit 21 of the MFP 20 displays the authentication condition setting screen 150 illustrated in FIG. 12 on the touch panel 23a. The touch panel 23a serves as a condition setting unit by displaying the authentication condition setting screen 150.

The authentication condition setting screen 150 has setting boxes 151 and 152 for setting the number of characters required for handwriting for each of the administrator authority and the general user authority.

The control unit 21 stores the number of characters required for handwriting inputted through the authentication condition setting screen 150 in the storage unit 22 of the MFP 20.

When the number of characters inputted in the setting box 151 for the administrator authority is equal to or less than the number of characters inputted in the setting box 152 for the general user authority, the control unit 21 urges re-input by displaying an error message on the touch panel 23a. Consequently, in the present embodiment, the number of characters required for handwriting set for the administrator authority is inevitably larger than the number of characters required for handwriting set for the general user authority.

It is noted that when three or more authority levels are set as the user's authority level, it is preferable that the higher the authority level, the more the number of characters required for handwriting.

Operation and Effect

As described above, according to the authentication system 1 of the present embodiment, the user authentication is performed by combining the password authentication performed based on the entire character string of the input password and the handwriting authentication performed based on the handwriting information of some characters of the handwritten password.

According to this, since the entire character string of the password is not handwritten on the touch panel 23a and only some characters are handwritten, even though someone steals a glance at the touch panel 23a, the password is not leaked. Furthermore, it is possible to improve user authentication accuracy by handwriting authentication of some characters. Thus, it is possible to reduce password leakage risk due to the handwriting input of the password while enabling the handwriting authentication of the password.

Furthermore, in the present embodiment, the number of characters required for handwriting can be set through the authentication condition setting screen 150. According to this, a user can freely adjust the number of characters required for handwriting such that the number of characters required for handwriting is not excessively larger than the number of characters of a character string constituting a password. Thus, it is possible to prevent the password from being leaked due to the handwriting of most of the character string of the password. From the standpoint of preventing password leakage, the number of characters required for handwriting is preferably equal to or less than ½ of the total number of characters, and more preferably equal to or less than ⅓ thereof.

Furthermore, in the present embodiment, when the control unit 21 requests the input of a password through the password input screen 130, the sequence position of a character required to be inputted in the handwriting input field 132b (the timing for displaying the handwriting input field 132b) is randomly determined.

According to this, since the timing for using the handwriting input field 132b is not fixed, the sequence position of a character inputted in the handwriting input field 132b (what number of character numbered from the initial character of the password) is less likely to be sensed by someone else. Thus, it is possible to further reduce password leakage risk.

Furthermore, in the present embodiment, the number of characters required for handwriting is changed according to a user's authority level. According to this, it is possible to increase the degree of freedom of setting of the authentication condition of a password.

In the present embodiment, the control unit 21 is configured to display an error when the number of characters required for handwriting for the administrator authority is equal to or less than the number of characters required for handwriting for the general user authority. Consequently, the number of characters required for handwriting for the administrator authority is inevitably larger than the number of characters required for handwriting for the general user authority. Thus, for a user with a high authority level, it is possible to enhance the degree of handwriting authentication in the user authentication, thereby tightening the user authentication.

Other Embodiment

In the aforementioned embodiment, a part of a password is handwritten and the rest is inputted by the soft key; however, the technology of the present disclosure is not limited thereto and for example, a hard key may be employed instead of the soft key.

Furthermore, in the aforementioned embodiment, the display timing of the handwriting input field 132b is randomly determined; however, the technology of the present disclosure is not limited thereto and character input from the handwriting input field 132b may be requested at a preset timing. For example, when it is determined to handwrite the second and fifth characters from the first character of a password, if the character input timings of the second and fifth characters of the password are reached, the character input unit 132 is switched from the soft keyboard 132a to the handwriting input field 132b.

What is claimed is:

1. An authentication system comprising:
   a storage unit configured to store a registration password including a character string, and handwriting information of handwriting data of the character string;
   an operation input unit configured to be able to input characters of a password by a key operation;
   a handwriting input unit configured to be able to input characters of a password by handwriting;
   a password request unit configured to request input of a part of characters of a password from the handwriting input unit and request input of remaining characters from the operation input unit; and
   a user authentication unit configured to perform user authentication by combining password authentication and handwriting authentication, the password authentication being performed by collating an entire character string of the password inputted using the operation input unit and the handwriting input unit with an entire character string of the registration password stored in the storage unit, the handwriting authentication being performed by collating the handwriting information of a part of characters of the password inputted by the handwriting input unit with handwriting information of the handwriting data of this inputted character stored in the storage unit.

2. The authentication system of claim 1, further comprising:
   a setting unit configured to be able to set in advance the number of characters of a character string constituting the password, which are requested by the password request unit to be inputted by the handwriting input unit.

3. The authentication system of claim 1, wherein the password request unit randomly determines a sequence position of the characters of the character string constituting the password, which are requested to be inputted by the handwriting input unit.

4. The authentication system of claim 1, wherein the password request unit requests input of a character, which is located at a preset sequence position in the character string constituting the password, by the handwriting input unit.

5. The authentication system of claim 1, wherein, in the storage unit, user identification information for identifying each user and an authority level of each user are stored in association with the registration password and the handwriting information of the handwriting data, and
   the authentication system further comprises:
   an identification information input unit configured to input the user identification information,
   wherein the password request unit is configured to read, from the storage unit, a user authority level corresponding to the user identification information inputted from the identification information input unit, and to change the number of characters, which are required to be inputted by the handwriting input unit, according to the authority level.

6. The authentication system of claim 5, wherein the password request unit is configured to increase the number of characters, which are required to be inputted by the handwriting input unit, as the user authority level is high.

* * * * *